US012612801B2

(12) United States Patent
Heid

(10) Patent No.: US 12,612,801 B2
(45) Date of Patent: Apr. 28, 2026

(54) STRIKE PLATE FOR DOOR ASSEMBLY MEMBERS

(71) Applicant: Endura Products, LLC, Colfax, NC (US)

(72) Inventor: George E. Heid, Charlotte, NC (US)

(73) Assignee: Endura Products, LLC, Colfax, NC (US)

( * ) Notice: Subject to any disclaimer, the term of this patent is extended or adjusted under 35 U.S.C. 154(b) by 110 days.

(21) Appl. No.: 18/232,645

(22) Filed: Aug. 10, 2023

(65) Prior Publication Data

US 2023/0383570 A1 Nov. 30, 2023

Related U.S. Application Data

(60) Continuation of application No. 17/988,401, filed on Nov. 16, 2022, now Pat. No. 11,725,418, which is a continuation of application No. 17/520,056, filed on Nov. 5, 2021, now Pat. No. 11,525,280, which is a (Continued)

(51) Int. Cl.
*E05B 15/02* (2006.01)

(52) U.S. Cl.
CPC .................................. *E05B 15/024* (2013.01)

(58) Field of Classification Search
CPC .... E05B 15/024; E05B 15/0245; E05B 15/02; E05B 15/022; E05B 15/0205; E05B 15/021; E05B 63/0056; E05B 1/00; E05B 2015/023; E05B 17/0004; Y10T 292/685; Y10T 292/68; Y10T 292/683; Y10T 292/688; Y10T 292/691; Y10T 292/696; Y10T 292/705; Y10T 292/707;
(Continued)

(56) References Cited

U.S. PATENT DOCUMENTS

| | | | |
|---|---|---|---|
| 213,967 | A | 4/1879 | Blackwood |
| 769,770 | A | 9/1904 | Phelps |
| 842,009 | A | 1/1907 | Record |

(Continued)

FOREIGN PATENT DOCUMENTS

| | | |
|---|---|---|
| CA | 1264786 | 1/1990 |
| DE | 2215305 | 10/1973 |

(Continued)

OTHER PUBLICATIONS

JP200412458 Espacenet machine translation claims and description (Year: 2025).*

(Continued)

*Primary Examiner* — Steven A Tullia
(74) *Attorney, Agent, or Firm* — IceMiller LLP

(57) ABSTRACT

A device and method for a strike plate for a door frame member and/or assembly is shown and described. The invention may be considered a strike plate assembly and, in other embodiments, a lock strike plate with and adjustable aperture. The strike plate may fit within a mortise pocket on a door member of a door frame. The invention may include an adjustable base plate and a top plate. In some examples, the strike plate may include a first horizontally extended linear opening. The strike plate assembly may be selectively positionable within the mortise pocket to facilitate lateral adjustability of an interior space within an interior aperture by movement of at least a portion of the strike plate laterally.

20 Claims, 12 Drawing Sheets

Related U.S. Application Data division of application No. 16/043,478, filed on Jul. 24, 2018, now Pat. No. 11,214,980.

(58) Field of Classification Search
CPC ...... E05C 9/004; Y10S 292/53; Y10S 292/54; Y10S 292/60
See application file for complete search history.

(56) References Cited

U.S. PATENT DOCUMENTS

| | | | | | |
|---|---|---|---|---|---|
| 872,053 | A | * | 11/1907 | Christy | E05B 15/0245 292/341.18 |
| 964,789 | A | | 7/1910 | Kozlowski | |
| 1,022,222 | A | | 4/1912 | Augenbraun | |
| 1,111,425 | A | | 9/1914 | Ziganek et al. | |
| 1,214,227 | A | * | 1/1917 | Schwenk | E05B 15/0245 292/341.19 |
| 1,272,115 | A | * | 7/1918 | Russell | E05B 15/0245 292/341.19 |
| 1,445,681 | A | * | 2/1923 | Hage | E05F 5/06 16/86 A |
| 1,793,115 | A | | 2/1931 | Model | |
| 1,913,444 | A | | 6/1933 | Herdeg | |
| 2,013,145 | A | | 9/1935 | Ferdinand | |
| 2,065,732 | A | | 12/1936 | Peace | |
| 2,086,049 | A | * | 7/1937 | Schlaman | E05B 15/0245 292/341.19 |
| 2,153,080 | A | | 4/1939 | Flora | |
| 2,231,414 | A | | 2/1941 | Model | |
| 2,412,497 | A | | 12/1946 | Edwards | |
| 2,484,024 | A | * | 10/1949 | Garberding | E05D 15/00 292/346 |
| 2,486,772 | A | | 11/1949 | Wuerl | |
| 2,650,848 | A | | 9/1953 | Garbs | |
| 2,695,807 | A | | 11/1954 | Bissot | |
| 2,695,808 | A | | 11/1954 | Manchester | |
| 2,713,506 | A | * | 7/1955 | Wickstrom | E05B 15/0245 244/7 R |
| 2,790,667 | A | | 4/1957 | Schoepe | |
| 2,798,754 | A | | 7/1957 | Russell | |
| 2,899,227 | A | * | 8/1959 | Charles-Louis Gchwend | E05C 1/12 70/463 |
| 2,993,719 | A | | 7/1961 | Manchester | |
| 3,006,677 | A | | 10/1961 | Royalty | |
| 3,179,458 | A | | 4/1965 | Sconzo | |
| 3,245,709 | A | | 4/1966 | Rosenberger | |
| 3,257,139 | A | * | 6/1966 | Russell | E05B 15/0245 292/341.18 |
| 3,287,055 | A | | 11/1966 | Schlage | |
| 3,395,935 | A | | 8/1968 | Rosenberger | |
| 3,416,828 | A | * | 12/1968 | Russell | E05B 15/0245 292/341.18 |
| 3,506,293 | A | | 4/1970 | Armstrong et al. | |
| 3,967,845 | A | * | 7/1976 | Governale | E05B 15/0205 292/346 |
| 4,035,093 | A | * | 7/1977 | Redshaw | F16B 5/0225 403/4 |
| 4,105,235 | A | * | 8/1978 | Thiel | E05B 15/0245 292/341.18 |
| 4,171,836 | A | | 10/1979 | St. Aubin | |
| 4,288,120 | A | | 9/1981 | Moore | |
| 4,492,397 | A | | 1/1985 | Allenbaugh | |
| 4,635,399 | A | * | 1/1987 | Gehrke | E05B 17/2003 49/504 |
| 4,813,724 | A | | 3/1989 | Dietrich | |
| 4,832,388 | A | | 5/1989 | Lozano | |
| 4,892,341 | A | | 1/1990 | Dietrich | |
| 4,893,854 | A | | 1/1990 | Dietrich | |
| 5,094,489 | A | * | 3/1992 | Jones | E05B 15/0205 292/DIG. 60 |
| 5,118,151 | A | | 6/1992 | Nicholas, Jr. et al. | |
| D351,781 | S | | 10/1994 | DeWitt | |
| 5,757,269 | A | * | 5/1998 | Roth | E05B 45/083 292/DIG. 60 |
| 5,871,387 | A | | 2/1999 | Straus | |
| 6,588,155 | B1 | * | 7/2003 | Theune | E06B 1/52 49/504 |
| 7,000,959 | B2 | | 2/2006 | Sanders | |
| 7,207,608 | B2 | | 4/2007 | Monts de Oca | |
| 7,240,931 | B1 | | 7/2007 | Casey | |
| 8,439,410 | B2 | * | 5/2013 | Sauder | E06B 1/603 292/341.19 |
| 9,340,996 | B2 | | 5/2016 | Nelson | |
| 9,422,742 | B2 | | 8/2016 | Pardoe | |
| 9,493,964 | B1 | | 11/2016 | Torrens | |
| 9,540,842 | B2 | | 1/2017 | Storr | |
| 10,544,602 | B1 | * | 1/2020 | Alvarado | E05B 15/025 |
| D897,818 | S | * | 10/2020 | Tien | D8/331 |
| 11,725,418 | B2 | | 8/2023 | Heid | |
| 12,173,529 | B2 | * | 12/2024 | Guillemette | E05B 17/2084 |
| 2003/0057718 | A1 | | 3/2003 | Stoehr | |
| 2005/0134061 | A1 | | 6/2005 | Milo | |
| 2006/0157991 | A1 | | 7/2006 | Nguyen | |
| 2007/0040397 | A1 | | 2/2007 | Nicholas et al. | |
| 2009/0077909 | A1 | | 3/2009 | Barthel | |
| 2009/0188289 | A1 | | 7/2009 | Orbeta | |
| 2012/0286527 | A1 | | 11/2012 | Mullet et al. | |
| 2014/0069038 | A1 | | 3/2014 | Back et al. | |
| 2016/0305156 | A1 | | 10/2016 | Kamody et al. | |
| 2018/0066449 | A1 | * | 3/2018 | Kamody | E05B 15/0245 |

FOREIGN PATENT DOCUMENTS

| | | | | | |
|---|---|---|---|---|---|
| DE | 202006015221 | U1 * | 4/2008 | E05B 15/0245 |
| DE | 202009014219 | U1 * | 1/2010 | E05B 15/022 |
| DE | 102015215458 | B3 | 12/2016 | |
| EP | 2248968 | A1 | 11/2010 | |
| EP | 2843160 | A1 * | 3/2015 | E05B 15/022 |
| FR | 1028324 | A | 5/1953 | |
| FR | 2614061 | B1 * | 8/1989 | E05B 17/007 |
| GB | 189921784 | A * | 9/1900 | |
| GB | 327218 | A * | 4/1930 | E05B 15/0205 |
| GB | 688749 | A * | 3/1953 | E05B 15/0245 |
| GB | 2168747 | A * | 6/1986 | E05B 15/0245 |
| GB | 2230294 | A | 10/1990 | |
| GB | 2243400 | A * | 10/1991 | E05B 15/024 |
| GB | 2245305 | A | 1/1992 | |
| GB | 2339836 | A * | 2/2000 | E05B 15/0205 |
| GB | 2383077 | A * | 6/2003 | E05B 15/0245 |
| GB | 2425567 | A * | 11/2006 | E05B 15/025 |
| IE | 20060799 | A1 * | 1/2008 | E05B 15/00 |
| JP | 3035041 | U * | 3/1997 | E05B 15/02 |
| JP | H09158553 | A * | 6/1997 | E05B 15/02 |
| JP | 2004124508 | A * | 4/2004 | E05B 15/02 |
| JP | 4120983 | B2 * | 7/2008 | |
| JP | 2015010398 | A * | 1/2015 | E05B 15/02 |
| KR | 100859241 | B1 * | 9/2008 | E05B 9/08 |
| KR | 102241320 | B1 * | 4/2021 | E05B 17/0045 |
| KR | 102509888 | B1 * | 3/2023 | E05B 15/022 |
| KR | 102509890 | B1 * | 3/2023 | E05B 17/0045 |
| WO | 03042474 | A1 | 5/2003 | |
| WO | WO-2010033102 | A2 * | 3/2010 | E05B 15/0245 |
| WO | 2011030291 | A4 | 5/2011 | |
| WO | 2012137230 | A1 | 10/2012 | |
| WO | 2016046440 | A1 | 3/2016 | |

OTHER PUBLICATIONS

JP2015010398 Espacenet machine translation claims and description (Year: 2025).*
JP-H09158553 Espacenet machine translation of claims and description (Year: 2025).*

* cited by examiner

STRIKE PLATE FOR DOOR ASSEMBLY MEMBERS

CROSS-REFERENCE TO RELATED APPLICATIONS

This application is a continuation of U.S. patent application Ser. No. 17/988,401, filed Nov. 16, 2022, which claims priority to and the benefit of U.S. patent application Ser. No. 17/520,056, filed Nov. 5, 2021, now U.S. Pat. No. 11,525,280, which claims priority to and the benefit of U.S. patent application Ser. No. 16/043,478, filed Jul. 24, 2018, now U.S. Pat. No. 11,214,980. The entire contents of each of the above applications are hereby incorporated by reference.

BACKGROUND

1. Technical Field

The present disclosure relates generally to strike plates for entranceways for example, for a building and, more particularly, to laterally adjustable strike plates for a door assembly for a residence/facility and for door assembly frame members.

2. Discussion of Related Art

Frame components, by way of example, jambs and mullions, along with thresholds and door panels, are assembled and installed as entranceways in buildings and residences. A strike plate on a door frame provides an aperture for receiving and retaining a lock latch. The positioning of the strike plate and door panel, which houses the lock, on the frame is intended to allow and/or provide desired alignment between these components when the door panel is in its closed position. Proper alignment provides appropriate compression of the door weather seal to prevent unwanted air and water infiltration, along with a desirable closing force.

With conventional strike plates, latch misalignment is possible and often occurs, for example, due either to assembly or installation error, and/or settling of a building. Typical strike plates do not allow for any adjustment of the aperture once installed. Thus, conditions of misalignment can lead to improper weather seal compression and resistance to environmental elements, thus leading to improperly operating door frames and door panels.

Additionally, strike plates typically include a fixed aperture edge. As the latch enters the aperture it slides along this fixed edge, which can add to the door panel closing force.

Thus, the Applicant recognized there remains a need for a new and improved strike plate device for door assemblies and frame members, and it is to these and other challenges that the inventions of the present disclosure are directed.

SUMMARY

The present disclosure is directed in one embodiment to a lock strike plate with an adjustable aperture. The strike plate may fit within a mortise pocket on a door frame.

In other embodiments the invention may be considered an adjustable strike plate assembly. The adjustable strike plate assembly may include an adjustable base plate, a top plate, and/or function as an adjustable unit. The base plate may include a base frame and an interior aperture surrounded by the base plate frame and having an interior space. In some examples, the strike plate may include a first horizontally extended linear opening and a second horizontally extended linear opening. The first horizontally extended linear opening may be positioned toward a first distal end of the base plate frame. The second horizontally extended linear opening may be positioned toward a second distal end of the base plate frame. The first linear opening and the second linear opening may be separated by the interior aperture.

The base plate may be adjustable and may be laterally movable within a door frame mortise pocket to alternatively widen or narrow the interior space within the interior aperture. The base plate frame may include a first side and a second side, with a width of the base plate frame extending between the first side and the second side. The base plate may include a first end and a second end. The first end and the second end may be distal ends.

A width of the base plate frame between the first side and the second side, in some examples, is less than a width of the mortise pocket, such that both of the first and second sides do not touch a side perimeter of the mortise pocket walls at the same time. The base plate may be selectively positionable within the mortise pocket. A central opening in the strike plate assembly may be alternatively widened or narrowed by laterally adjusting the base plate horizontally beneath the top plate.

The base plate may include a roller for reducing friction when a latch of a door panel is moved into a closed position.

The adjustable base plate may include, in some embodiments, at least one position indicator.

The top plate may include top plate first distal end, a top plate second distal end, a top plate first side and a top plate second side. The top plate may also include a central aperture, a first mounting hole, and a second mounting hole. The first mounting hole may be positioned toward a first distal end of the top plate to align at more than one point along the first horizontally extended linear opening in the base plate. The second mounting hole may be positioned toward a second distal end of the top plate to align at more than one point along the second horizontally extended linear opening in the base plate.

In some embodiments, the top plate includes at least one notch in the top plate that aligns with the position indicator and is configured to create a view panel to view the position indicator through the at least one notch. Some examples may include a notch on one end of the central aperture of the top plate and a notch on an opposite end of the central aperture of the top plate in order to facilitate a base plate alignment and repositioning.

The base plate may include mounting attachments in the base plate, internally located within the interior space. The mounting attachments may be spaced apart and at opposite ends of the interior space. The mounting attachments may extend into the internal space. The mounting attachments may project from the base plate frame into the interior space.

The base plate may include at least one anchoring protrusion. The base plate may include a set of anchoring protrusions. Sets of anchoring protrusions may be clustered around the base plate first distal end and the base plate second distal end.

The base plate frame may include a first side and a second side, and a width of the base plate frame between the first side and the second side may be less than a width of the mortise pocket, such that both of the first and second sides do not touch a side perimeter of the mortise pocket walls at the same time.

Still, in other embodiments the inventions of the present disclosure may include a door frame including an assembly of frame members, a mortise pocket, and an adjustable strike plate assembly. The assembly may be a laterally adjustable strike plate assembly.

The base plate may include a base plate frame, an interior aperture surrounded by the base plate frame and having an interior space, a first horizontally extended linear opening positioned toward a first distal end of the base plate frame, and a second horizontally extended linear opening positioned toward a second distal end of the base plate frame. The first linear opening and the second linear opening may be separated by the interior aperture.

In this embodiment, the top plate may include a central aperture, a first mounting hole, and a second mounting hole. The first mounting hole may be positioned toward a first distal end of the top plate to align at more than one point along the first horizontally extended linear opening in the base plate, and the second mounting hole may be positioned toward a second distal end of the top plate to align at more than one point along the second horizontally extended linear opening in the base plate. The base plate may be selectively positionable within the mortise pocket. The base plate may include a first ledge. The base plate may include a second ledge. The second ledge may protrude from the first ledge. The first ledge and second ledge may be located in separate planes. The second ledge may include a roller slot for accepting a roller into the base plate.

The invention of the present disclosure also includes methods for an adjustable strike plate and methods for an adjustable strike plate assembly. In one example, a method for selectively positioning a strike plate assembly in a door frame includes sizing the outer perimeter width of a base plate to be less than the inner width of a mortise pocket, sizing a top plate to cover the base plate and the mortise pocket when the base plate is attached to the mortise pocket and the top plate is attached to the base plate, providing a first horizontally extended linear opening positioned toward a first distal end of the base plate frame, providing a second horizontally extended linear opening positioned toward a second distal end of the base plate frame, allowing the base plate to adjust from the first position to a second position in a lateral adjustment, wherein said adjustable base plate is laterally movable within the door frame mortise pocket to alternatively widen or narrow an interior space within an interior aperture, and mating a first mounting hole and a second mounting hole in variable positions along the first horizontally extended linear opening and the second mounting hole along the second horizontally extended linear opening.

These and other aspects of the inventions of the present disclosure will become apparent to those skilled in the art after a reading of the following description of embodiments when considered with the drawings.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
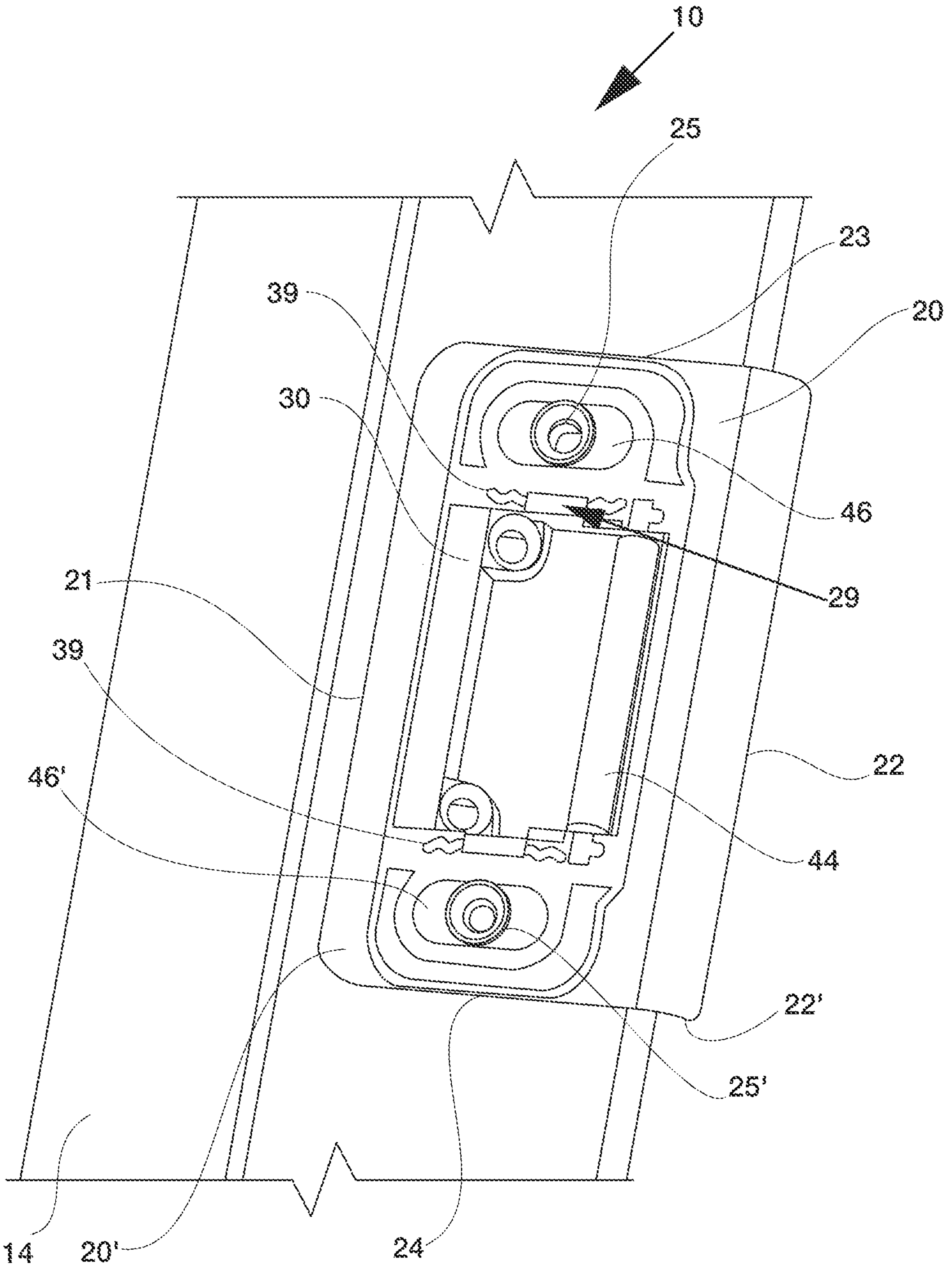
FIG. 1 is a front cutaway view of one embodiment of a strike plate assembly for a door frame assembly constructed according to the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms “a,” “an,” “the,” and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

In the following description, like reference characters designate like or corresponding parts throughout the several views. Also in the following description, it is to be understood that such terms as “forward,” “rearward,” “left,” “right,” “upwardly,” “downwardly,” and the like are words of convenience and are not to be construed as limiting terms.

A door frame may include one or more frame members attached in a door frame assembly. A plurality of frame members may include any combination of a header and a pair of side jambs. A header may be generally placed toward the top of the door panel. Side jambs and may be generally placed at opposing sides of the door panel, and a threshold toward the bottom of the door panel. However, in some embodiments, the side jambs are not directly adjacent to the door panel. A door panel may further include hinges. Hinges may connect the door panel to at least one of the frame members. In another embodiment, hinges may connect the door panel to a mullion. There may be three or more hinges.

Figure 2:
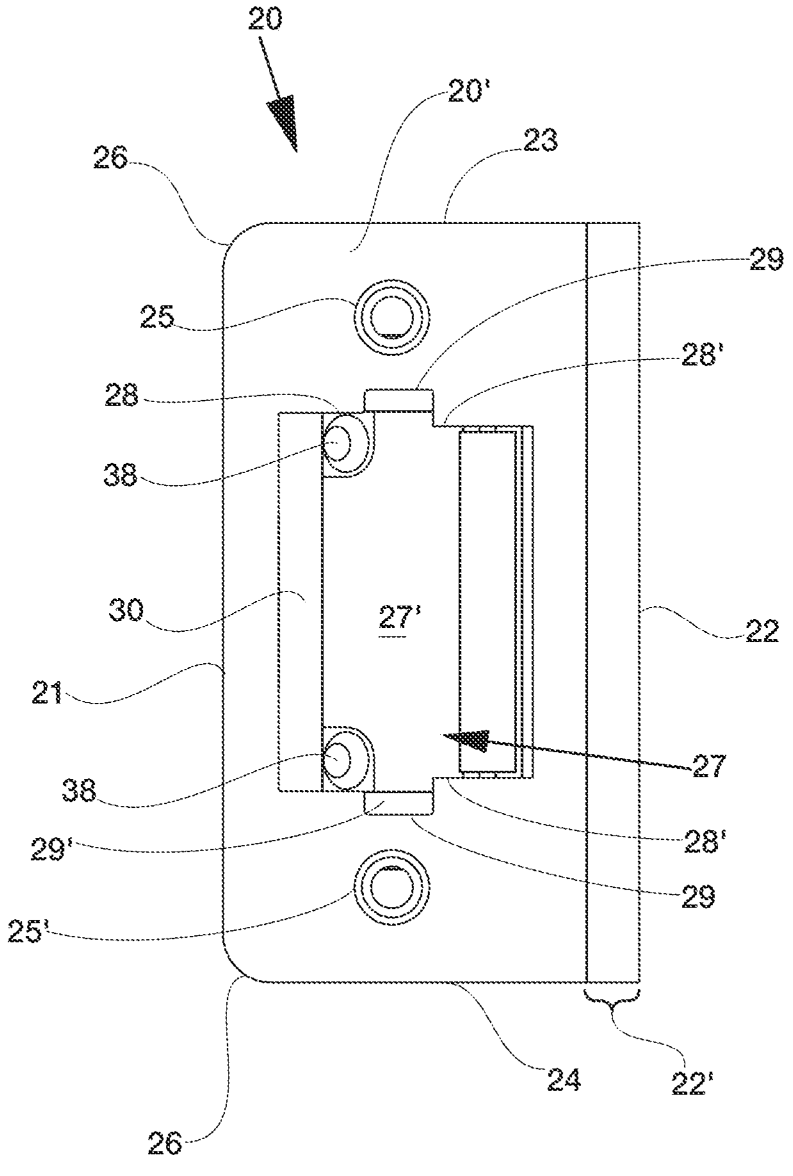
FIG. 2 is front view of one embodiment of a strike plate assembly having a top plate device constructed according to the present disclosure.
Figure 3:
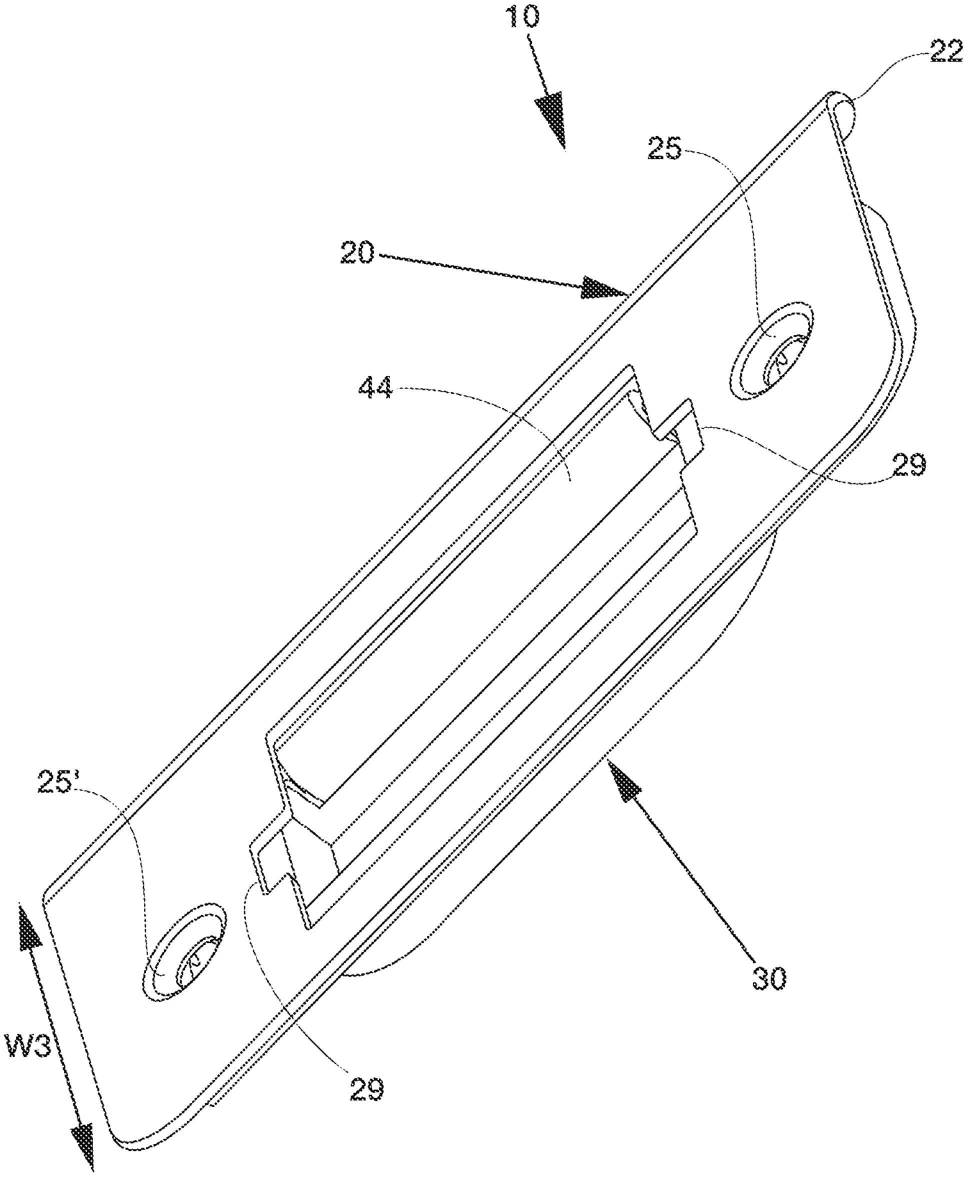
FIG. 3 is a side perspective view of one example of the strike plate device of FIG. 2.

Referring now to the drawings in general and FIGS. 1 through 3 in particular, it will be understood that the illustrations are for the purpose of describing a preferred embodiment of the inventions and are not intended to limit the inventions thereto. FIG. 1 shows, an adjustable strike plate assembly 10 situated in a door frame member 14 of a door frame assembly. The strike plate assembly 10 may include an adjustable base plate 30 and a top plate 20 fitted with a mortise pocket 51 (see FIG. 5).

The top plate 20 may include a top plate frame 20' having a top plate first distal end 23, a top plate second distal end 24, a top plate first side 21 and a top plate second side 22. The top plate may also include a central aperture 27 creating a central opening 27', a first mounting hole and a second mounting hole 25'. The first mounting hole 25 may be positioned toward a first distal end 23 of the top plate 20 to align at more than one point along a first horizontally extended linear opening 46 in the base plate 30. The second mounting hole 25' may be positioned toward a second distal end 24 of the top plate 20 to align at more than one point along the second horizontally extended linear opening 46' in the base plate 30.

In some embodiments, the top plate 20 includes at least one notch 29 in the top plate that aligns with a position indicator 39 on the base plate 30 and is configured to create a view panel 29' to view the position indicator 39 through the at least one notch 29. Some examples may include a notch 29 on one end of the central aperture 27 of the top plate 20 and a notch 29 on an opposite end of the central aperture 27 of the top plate 20 in order to facilitate a base plate 30 alignment and repositioning.

Top plate frame 20' may include a shoulder 28. Top plate frame 20' may include a drop shoulder 28'. The internal perimeter of the central aperture 27 may include a shoulder 28 toward a first distal end 23 and a shoulder 28 toward a second distal end 24. The internal perimeter may also include a drop shoulder 28', that protrudes further into the central opening 27' more than the shoulders 28, located toward the first distal end 23 and another drop shoulder 28' toward the second distal end 24. The opposing drop shoulders 28' may create a roller opening so that the roller 44 is able to be secured in the strike plate assembly in an exposed manner, situated in the base plate 30 and projecting through a front side 60 of the top plate.

The top plate 20 may include at least one rounded corner 26. Top plate 20 may also include a curved corner with a radiused edge 22' extending along one side. The edge 22' (see FIG. 10) may extend past a plate formed by a top plate back side 62. The edge 22' allows the top plate in use to extend around a frame member and ease receipt of a lock latch from a shutting door.

As seen in FIG. 3, top plate 20 may include a width W3 extending from the first side 21 to the second side 22.

Figure 4:
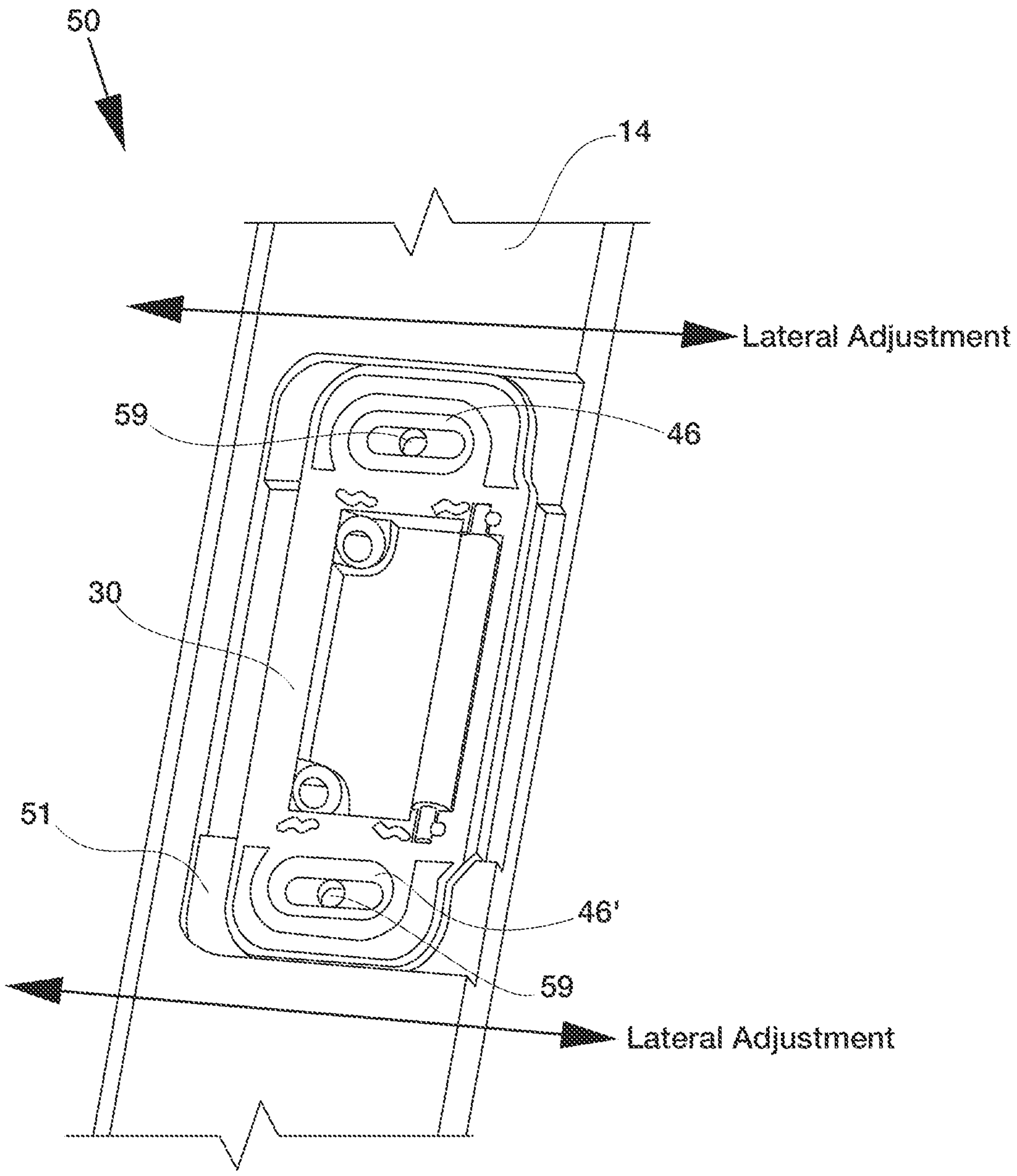
FIG. 4 shows a front perspective view of one example of a base plate mounted with a door frame member constructed according to the present disclosure.
Figure 5:
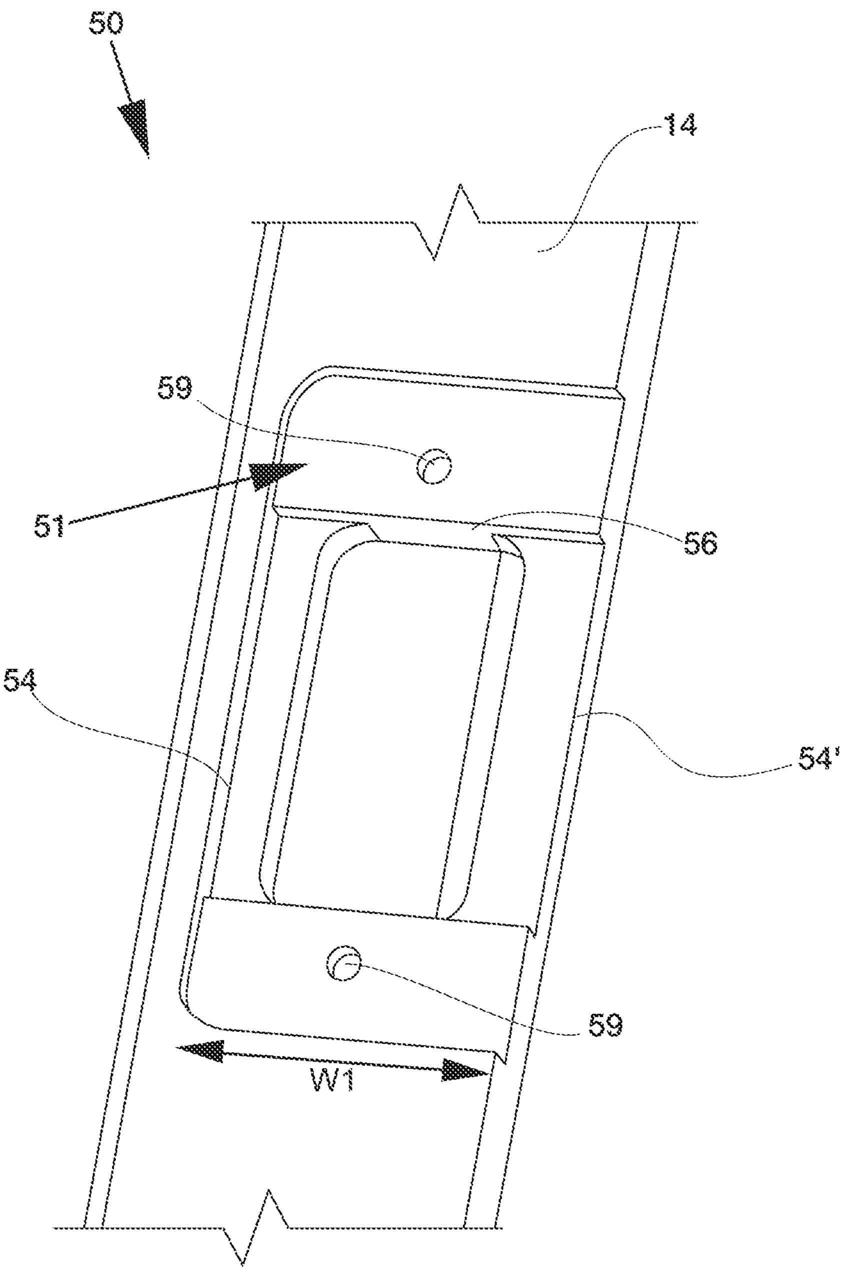
FIG. 5 shows one example of a door frame, including a door frame member having a mortise pocket.
Figure 7:
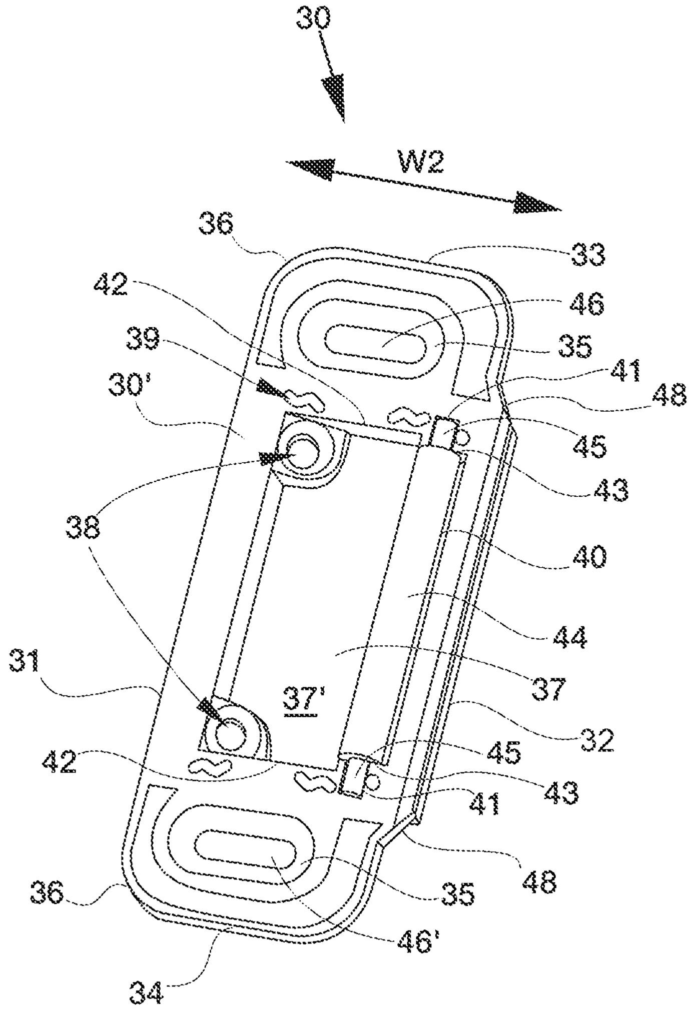
FIG. 7 is front perspective view of one example of a base plate constructed according to the present disclosure.

FIGS. 4, 5 and 7 show a base plate 30 and a door frame mortise pocket 51 into which the base plate 30 is fitted. Base plate 30 may include a base frame 30' and an interior aperture 37 surrounded by the base plate frame 30', the interior aperture 37 creating an interior space 37'. The base plate 30 may be adjustable and may be laterally movable within a door frame mortise pocket 51, to alternatively widen or narrow the interior space 37' within the interior aperture laterally that is available through the top plate 20 when installed. Alternatively, the base plate 30 may be adjustable within the mortise pocket 51 to maintain a consistent space within the interior aperture 37 even when a door frame moves with a settling house or with tension place on the door. The base plate frame 30' may include a first side 31 and a second side 32, with a width W2 of the base plate frame 30' extending between the first side 31 and the second side 32. The base plate 30 may include a first end 33 and a second end 34. The first end 33 and the second end 34 may be distal ends.

In some examples, the base plate 30 may include a first horizontally extended linear opening 46 and a second horizontally extended linear opening 46', both formed by opening perimeters 35 within the base plate frame 30'. The first horizontally extended linear opening 46 may be positioned toward a first distal end 33 of the base plate frame 30'. The second horizontally extended linear opening 46' may be positioned toward a second distal end 34 of the base plate frame 30'. The first linear opening 46 and the second linear opening 46' may be separated by the interior aperture 37.

A width W2 of the base plate frame 30' between the first side 31 and the second side 32, in some examples, is less than a width of the mortise pocket WI, such that both of the first and second sides 31, 32 do not touch a side perimeter of the mortise pocket walls 54, 54' at the same time. The base plate 30 may be selectively positionable within the mortise pocket 51, and expose a mortise opening within the mortise inner perimeter. A central opening 27' in the strike plate assembly 10 may be alternatively widened or narrowed or maintained by laterally adjusting the base plate 30 horizontally beneath the top plate 30.

Figure 6:
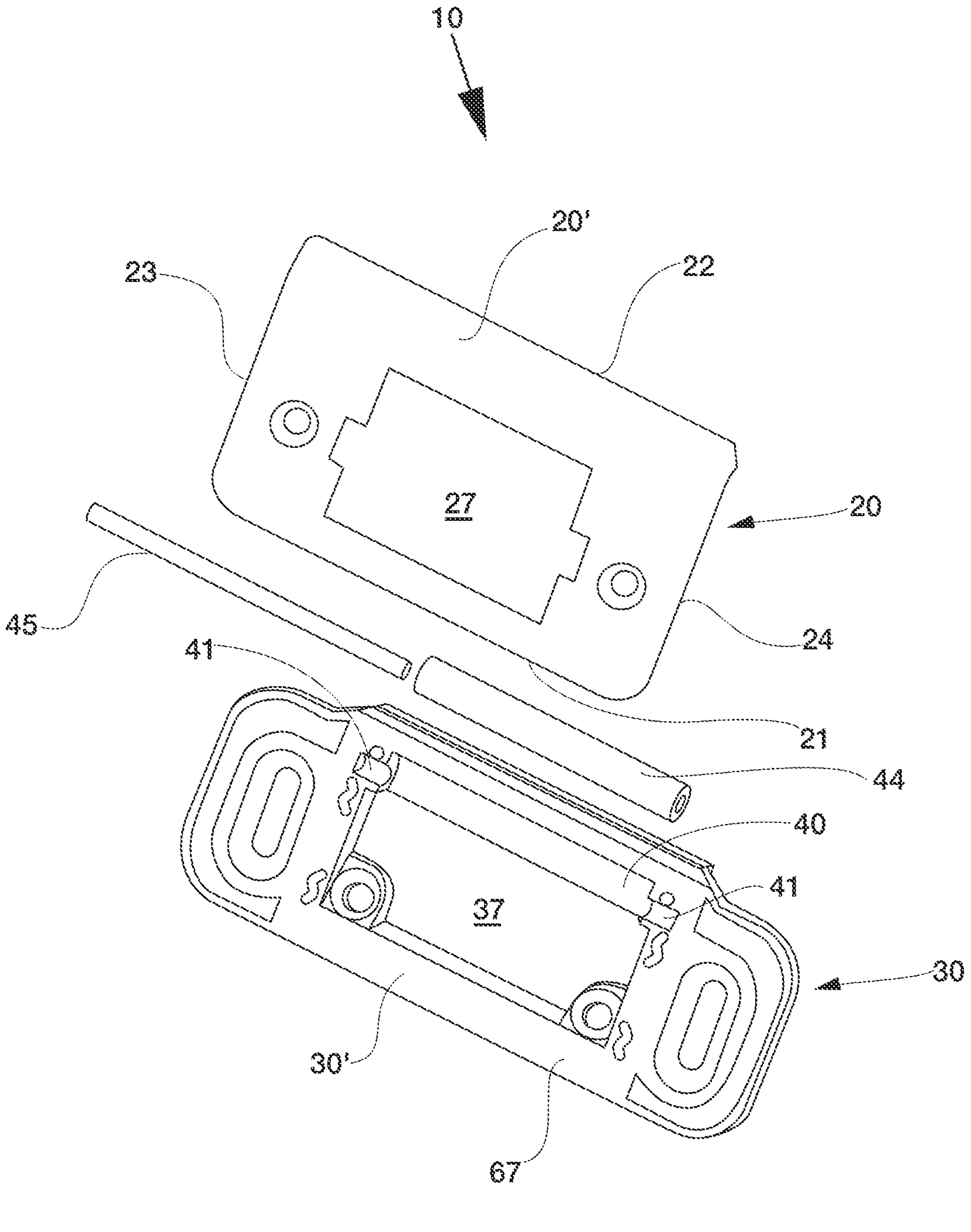
FIG. 6 shows an exploded view of one example of a strike plate assembly according to the present disclosure.

The base plate may include a roller 44 for reducing friction when a latch of a door panel is moved into a closed position. Roller 44 may be received into a roller slot 40. Base plate 30 may include a base plate drop shoulder 43. A pin 45 may fit with the roller 44 along a medial section of the roller, leaving pin ends exposed at each end. The ends of the pin 45 may fit in pin slots 41, the pin slots, in one example being formed by shoulders 43. The top plate 20 when attached to the base plate 30 may cover and secure the ends of the pin 45 in the pin slots 41, thus securing the roller in the strike plate assembly 10. The drop shoulders 28' may serve to cover the ends of pin 45 to secure the roller 44 and still maintain central opening 27'. The roller 44 may extend end to end along one side of the central opening 27' between two drop shoulders 28' in the central opening 27'. Roller 44 may provide a non-fixed edge to receive the latch as it enters the assembly to reduce door panel closing force. Roller 44 may provide a rolling edge to receive the latch. FIG. 6 shows an exploded view of a strike plate assembly 10 unit separated into individual component parts. The pin 45 fitting through the roller 44. The roller 44 with the pin 45 fitting into the base plate 30 in the roller slot 40 and pin slots 41. The top plate 20 mating with the base plate 30, securing the roller 44 and pin 45 into place in the assembled strike plate unit.

The adjustable base plate 30 may include, in some embodiments, at least one position indicator 39. Position indicators 39 may be present at a portion of or adjacent to all of the corners outside the perimeter ends 42 of interior perimeter 37. Notch 29 in top plate 20 may align with the position indicator 39 and is configured to create a view panel to view the position indicator 39 through the at least one notch 29. The position indicator 39 and notch 29 together provide a position awareness of the placement of the base plate 30 as to the top plate 20 and of the adjustable strike plate assembly 10 in the mortise pocket 51 and facilitate alignment and repositioning. There may be a set of position indicators 39. In some embodiments, there may be a set of notches 29 medially located along each end of the central aperture 27. Notch 29 may be a cutaway section of top plate frame 20'.

The base plate 30 may include mounting attachments 38 in the base plate, internally located within the interior space 37'. Mounting attachments 38 may be integral with base plate 30. The mounting attachments 38 may be spaced apart and at opposite ends of the interior space 37'. The mounting attachments may extend into the internal space 37'. The mounting attachments 38 may project from the base plate frame 30' into the interior space 37'. Mounting attachments 38 may be substantially offset from a medial point of the interior space 37' along the width W2. The mounting attachments 38, by way of example, may be configured to secure the base plate within a mortise pocket 51. The mounting attachments 38 may align with the first and second horizontally extended linear openings 46, 46' along one edge of the opening perimeter of the openings 46, 46'. This alignment maybe offset from a medial point along the width of the interior space 37' and toward a side of the interior aperture 37. Some examples may include embodiments where the mounting attachments 38 provide an anchor spot for the base plate 30 separated and apart from the anchor spot for the top plate at mounting hole 25, 25'. The mounting attachments 38 may be, by way of example, provide mounting screw holes or fastener holes for tacks, pins, staples, etc.

Figure 8:
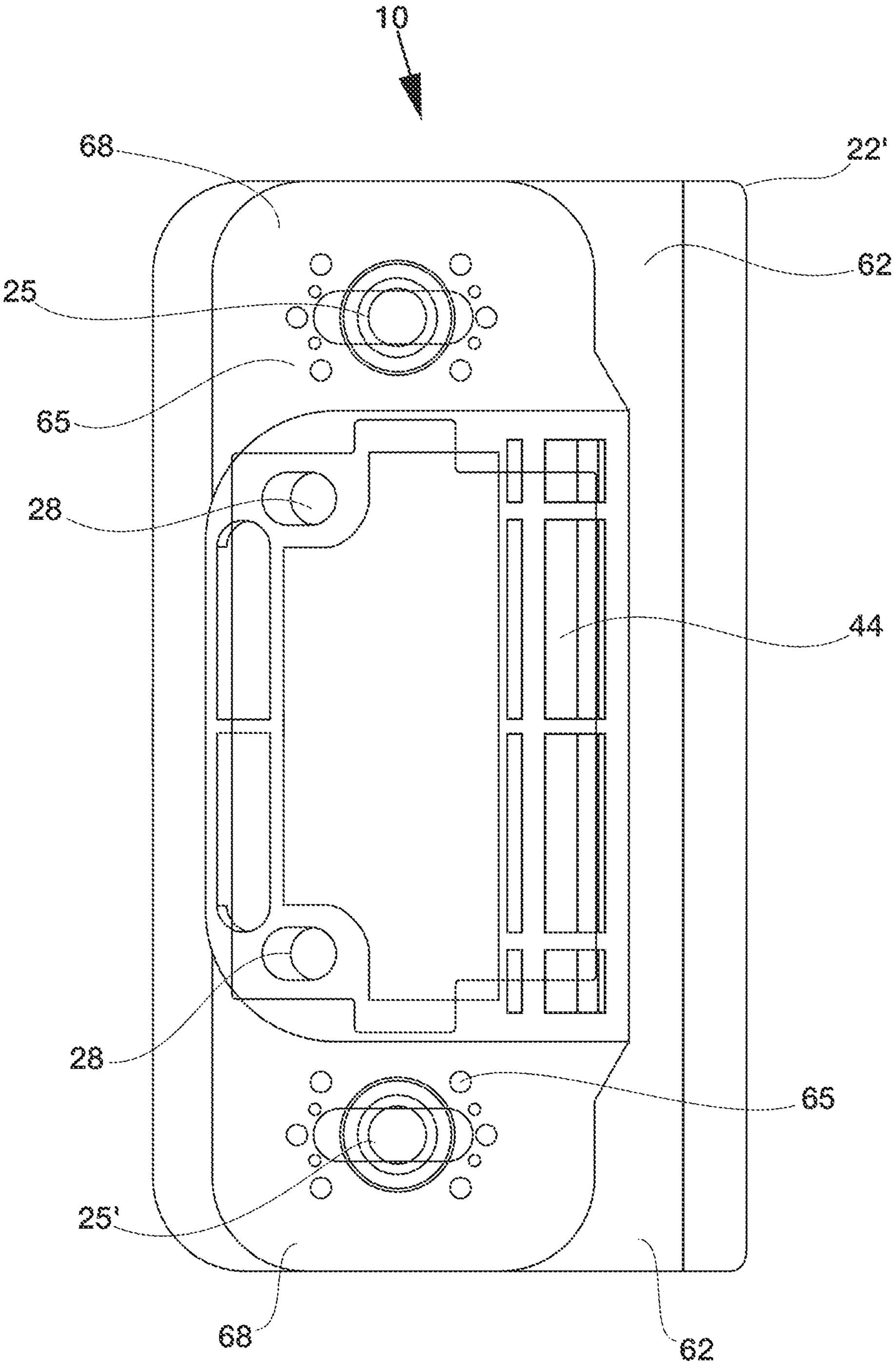
FIG. 8 is a back view showing one example of a strike plate assembly constructed according to the present disclosure.
Figure 9:
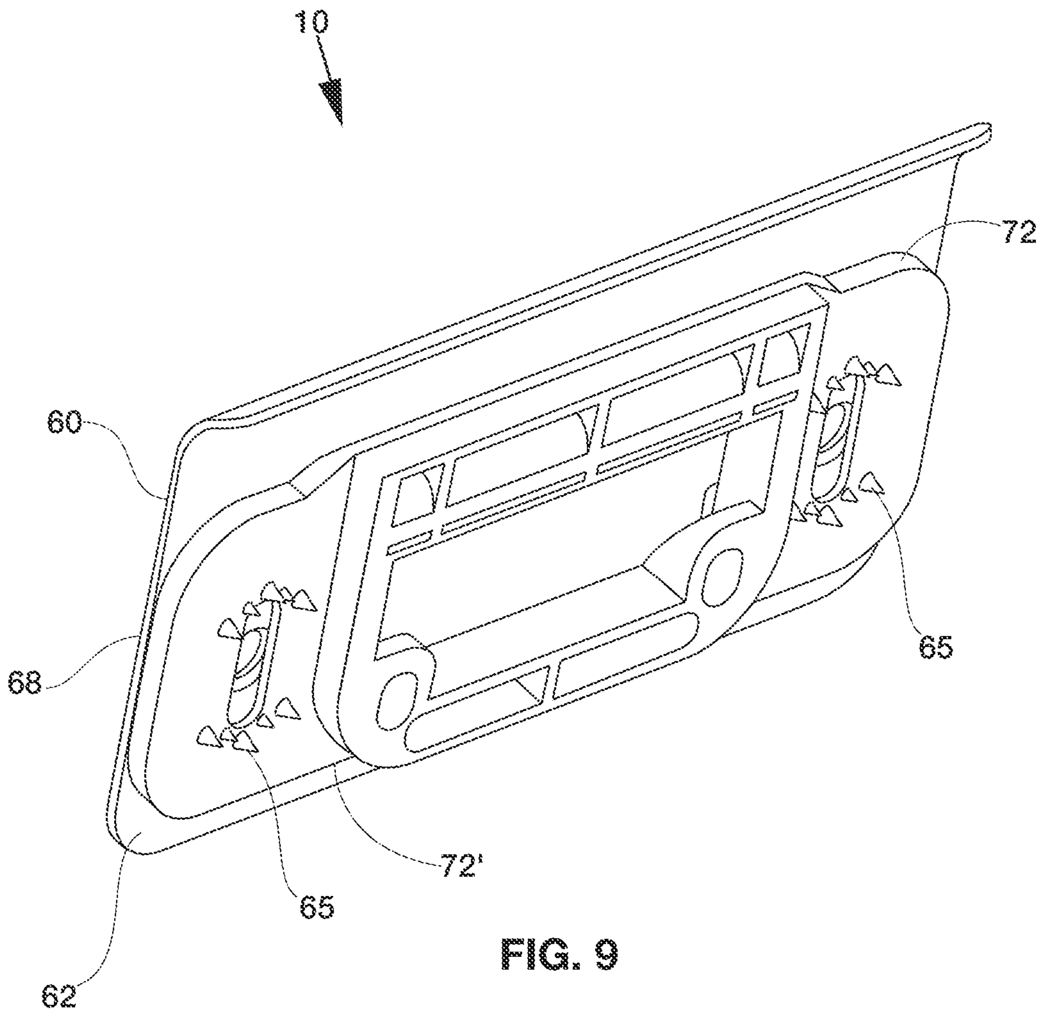
FIG. 9 shows a perspective back view of an example of the strike plate assembly of FIG. 8.
Figure 10:
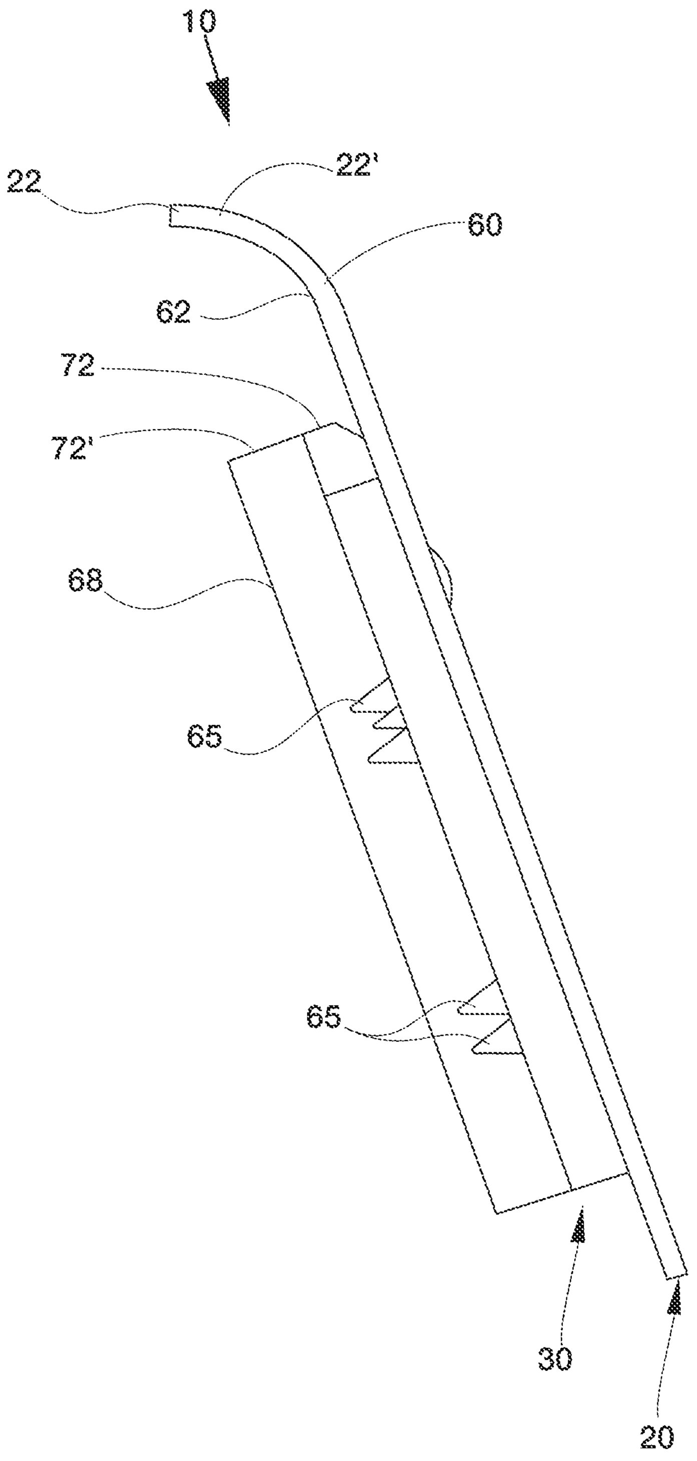
FIG. 10 shows an end view of one example of the strike plate assembly of FIG. 9.

The base plate 30 may include at least one anchoring protrusion 65, as example of which is seen in FIGS. 8-10. The base plate 30 may include a set of anchoring protrusions 65. Sets of anchoring protrusions 65 may be clustered around the base plate first opening 46 and second opening 46'. The anchoring protrusions 65 may be configured to assist in securing the base plate 30 within the mortise pocket 51. The anchoring protrusions 65 clustered in a set may take on variable diameters and/or lengths.

The base plate frame 30 may include a first side 31 and a second side 32, and a width W2 of the base plate frame 30' between the first side 31 and the second side 32 may be less than a width W1 of the mortise pocket, such that both of the first and second sides 31, 32 do not touch a side perimeter of the mortise pocket walls 54, 54' at the same time. In some examples, the base plate 30 may be adjustable within the mortise pocket 51 and the top plate 20 and base plate 30 for a unit that does not adjust as to each other but does adjust with the mortise pocket as a unit. In other examples, the base plate 30 may be secured within the mortise pocket and the base plate 30 and top plate 20 adjust laterally across one another, with the top plate being adjustable, to provide an adjustable strike plate assembly 10. In some embodiments, base plate frame 30 may include corners 46 along the outer perimeter of the frame, with the corners 46, in some examples being rounded and/or curved, without culminating in pointed intersections between the sides and the edges.

Other embodiments the inventions of the present disclosure may include a door frame including an assembly of frame members 14, a mortise pocket 51, and an adjustable strike plate assembly 10. The assembly may be a laterally adjustable strike plate assembly.

In this example, base plate 30 may include a base plate frame 30', an interior aperture surrounded by the base plate frame and having an interior space, a first horizontally extended linear opening 46 positioned toward a first distal end 33 of the base plate frame 30', and a second horizontally extended linear opening 46' positioned toward a second distal end 34 of the base plate frame 30'. The first linear opening 46 and the second linear opening 46' may be separated by the interior aperture 37.

Further in this embodiment, the top plate 20 may include a central aperture 27, a first mounting hole 25, and a second mounting hole 25' that align with mortise pocket mounting holes 59. The first mounting hole 25 may be positioned toward a first distal end 23 of the top plate to align at more than one point along the first horizontally extended linear opening 46 in the base plate 30, and the second mounting hole 25' may be positioned toward a second distal end 24 of the top plate to align at more than one point along the second horizontally extended linear opening 46' in the base plate 30. The base plate 30 may be selectively positionable within the mortise pocket and/or the top plate 20 may be selectively positional laterally as to the base plate 30.

The base plate 30 may include a first ledge 72 that extends in one plane outwardly from a base plate front side 67 and extends to a base plate back side 68 in a first plane. The base plate may include a second ledge 72' that forms a shelf that extends outwardly from the base plate back side 68 in a second plane. The shelf formed by the second ledge 72' may include a smaller footprint than the footprint of the first ledge 72. The second ledge 72' may protrude from the first ledge 72. The first ledge 72 and second ledge 72' may be located in separate planes. The second ledge 72' may include a roller slot 40 for accepting and/or recessing a roller 44 into the base plate 30. A portion of the roller 44 may reside in the second ledge, a portion of the roller may reside in the first ledge and the roller may protrude from the first plane into the plane formed by the top plate frame 30'.

Figure 11:
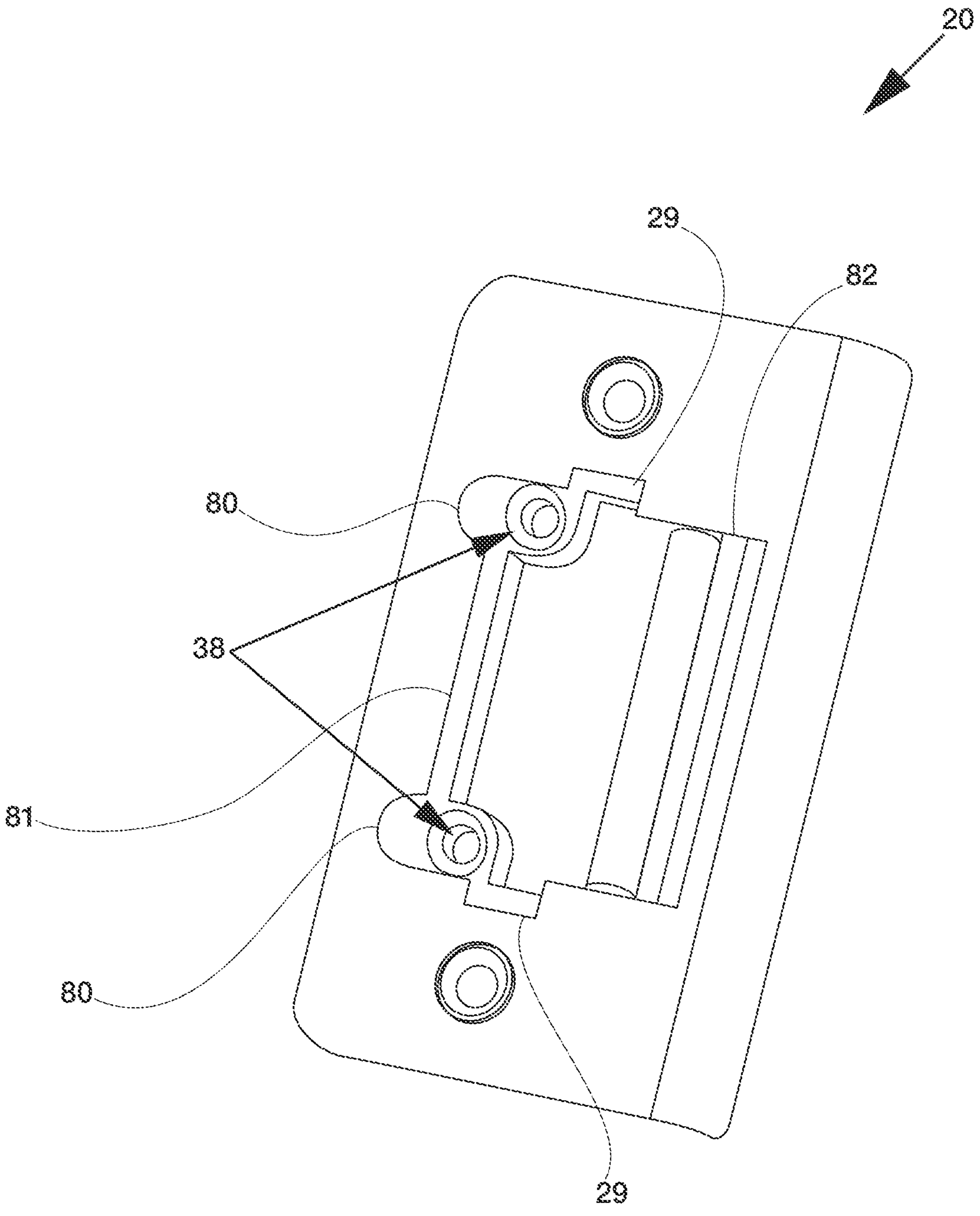
FIG. 11 is a front perspective view of another example of a strike plate according to the inventions of the present disclosure.

FIG. 11 shows another example of a strike plate assembly 10 seen as a unit. Top plate 20 may include offset notches 29, extended recesses 80 and/or extended slots 82. The extension recesses 80 allow for lateral movement of the top plate 20 as to mounting holes 25, 25'. Extended roller slot 82 may allow for lateral movement of top plate 20 as to roller 44 and/or of base plate 30 as to top plate 20. In one example, a recessed side 81 extends between extended recesses 80 and parallel to a first side 21, in this embodiment, accommodating mounting attachments 38 with inner curved projections and allowing, in some positions, a portion of the base plate to be visible along the edge of the recessed side 81.

Figure 12:
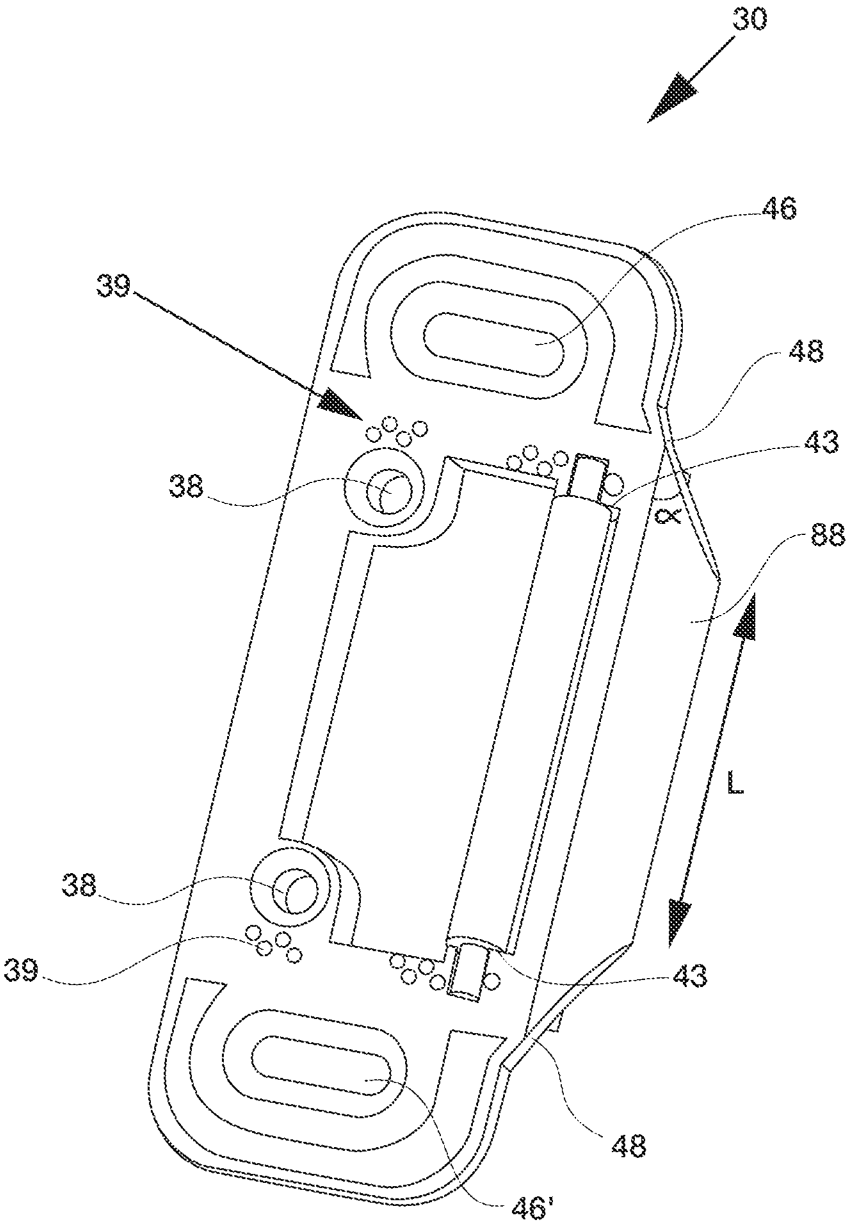
FIG. 12 is a front perspective view of another example of a base plate according to the inventions of the present disclosure.

FIG. 12 shows another embodiment of a base plate 30 including a lip 88 projecting from one side of base plate 30. The lip 88 may form an extended second side 32. An extension 48 may project from one side of base plate 30, in some examples, between a 20 degree to 60 degree angle (alpha). In some examples, the extension 48 may include about a 45 degree angle (alpha) from the side of the base plate to the lip 88. The lip 88 may extend from the extension 48 to form a narrowing lip. The lip 88 may include a length L. The length L may be less than a length between the ends of the two extensions 37. The length L and the length between the ends of the extension may be less than the length between the two ends 23, 24 of the base plate 30. Position indicators 39 may take on any shape, pattern, demarcation such as marking and coloring, and/or may include raised nodules and/or recesses.

The invention of the present disclosure also includes methods for an adjustable strike plate and methods for an adjustable strike plate assembly. In one example, a method for selectively positioning a strike plate assembly 10 in a door frame 50 includes sizing the outer perimeter width W2 of a base plate 30 to be less than the inner width W1 of a mortise pocket 51, sizing a top plate 20 to cover the base plate 30 and the mortise pocket 51 when the base plate 30 is attached to the mortise pocket 51 and the top plate 20 is attached to the base plate 30, providing a first horizontally extended linear opening 46 positioned toward a first distal end 33 of the base plate frame 30', providing a second horizontally extended linear opening 46' positioned toward a second distal end 34 of the base plate frame 30', allowing the strike plate 10 to adjust from a first position to a second position in a lateral adjustment within the mortise pocket 51, wherein said adjustable strike plate assembly 10 is laterally movable within the door frame mortise pocket 51 to alternatively move an interior space within a central opening 27', and mating a first mounting hole 25 and a second mounting hole 25' in variable positions along the first horizontally extended linear opening 46 and the second mounting hole along the second horizontally extended linear opening 46'. The method may include securing a roller in a roller slot in the base plate for reducing friction when a latch or a door panel is moved into a closed position. Further, the method may include placing mounting attachments in the base plate internally located within an interior space.

Other inventions of the present disclosure include methods by way of any of the embodiments of a strike plate assembly 10 disclosed herein. The scope of the disclosure should also be considered to include combinations of any of the embodiments top plate 20 and base plate 30 disclosed herein to form a strike plate assembly 10.

Certain modifications and improvements will occur to those skilled in the art upon a reading of the foregoing description. It should be understood that all such modifications and improvements have been deleted herein for the sake of conciseness and readability but are properly within the scope of the following claims.

Although the method steps are described in a specific order, it should be understood that other steps may be performed in between described steps, described steps may be adjusted so that they occur at slightly different times, or the described steps may occur in any order unless otherwise specified.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. An adjustable strike plate assembly laterally moveable within a mortise pocket of a door frame, the adjustable strike plate assembly comprising:

a base plate having a front side and a back side, opposite the front side, the base plate defining an interior aperture, at least one position indicator, and a pair of horizontal slots, the pair of horizontal slots separated by the interior aperture, the base plate configured to move laterally within the mortise pocket; and a top plate having a front side and a back side opposite the front side, the top plate defining a central aperture enclosed on all sides by the top plate, at least one notch that aligns with the at least one position indicator and is configured to create a view panel to view the at least one position indicator through the at least one notch, and a pair of mounting holes, the pair of mounting holes separated by the central aperture and disposed through the top plate such that each mounting hole aligns with a respective horizontal slot of the base plate, the front side of the base plate in contact with the back side of the top plate such that lateral movement of the base plate within the mortise pocket relative to the top plate selectively adjusts a lateral position of the interior aperture relative to the central aperture, the front side of the base plate and the back side of the top plate being coplanar with each other.

2. The adjustable strike plate assembly according to claim 1, wherein the base plate is moveably disposed within the mortise pocket when the base plate contacts the top plate along the back side of the top plate.

3. The adjustable strike plate assembly according to claim 1, wherein the back side of the top plate has a smooth surface.

4. The adjustable strike plate assembly according to claim 1, wherein the pair of horizonal slots constrain the lateral movement of the base plate relative to the top plate.

5. The adjustable strike plate assembly according to claim 1, wherein the base plate includes a plurality of anchoring protrusions extending from back side of the base plate.

6. The adjustable strike plate assembly according to claim 5, wherein the plurality of anchoring protrusions are disposed about each horizontal slot of the pair of horizontal slots.

7. The adjustable strike plate assembly according to claim 5, wherein the plurality of anchoring protrusions are conical protrusions.

8. The adjustable strike plate assembly according to claim 1, wherein the base plate and the top plate align such that the lateral position of the interior aperture relative to the central aperture defines an interior space therebetween, lateral movement of the base plate selectively widening or narrowing a lateral width of the interior space.

9. An adjustable strike plate assembly laterally moveable within a mortise pocket of a door frame defined by a pair of opposed pocket walls, the adjustable strike plate assembly comprising:

a base plate defining an interior aperture enclosed on all sides by the base plate and at least one position indicator, the base plate configured to move laterally within the mortise pocket;

a top plate defining a central aperture and at least one notch that aligns with the position indicator and is configured to create a view panel to view the at least one position indicator through the at least one notch, the top plate vertically aligned with the base plate such that movement of the base plate within the mortise pocket relative to the top plate selectively adjusts a lateral position of the interior aperture relative to the central aperture; and a roller rotatably coupled to the base plate within the interior aperture such that a portion of the roller projects through the central aperture of the top plate and movement of the base plate relative to the top plate adjusts a lateral placement of the roller within a width of the central aperture of the top plate.

10. The adjustable strike plate assembly according to claim 9, wherein the base plate defines a pair of horizontal slots, the pair of horizontal slots separated by the interior aperture.

11. The adjustable strike plate assembly according to claim 10, wherein the top plate defines a pair of mounting holes, the pair of mounting holes separated by the central aperture and disposed through the top plate such that each mounting hole aligns with a respective horizontal slot of the base plate.

12. The adjustable strike plate assembly according to claim 9, wherein the roller is configured to reduce friction between the strike plate assembly and a latch of a lock.

13. The adjustable strike plate assembly according to claim 9, wherein the base plate has a first side and a second side opposite the first side, the base plate being configured to move laterally within the mortise pocket such that movement of the base plate is constrained by engagement of the first side or the second side of the base plate with a respective pocket wall of the mortise pocket.

14. An adjustable strike plate assembly comprising:

a base plate having a front most surface, the base plate defining an interior aperture and at least one position indicator; and a top plate having a back most surface, the top plate defining a central aperture enclosed on all sides by the top plate and at least one notch that aligns with the position indicator and is configured to create a view panel to view the at least one position indicator through the at least one notch, the base plate and the top plate moveably affixed to one another with the front most surface of the base plate in contact with the back most surface of the top plate such that lateral movement of the base plate relative to the top plate selectively adjusts a lateral position of the interior aperture relative to the central aperture.

15. The adjustable strike plate assembly according to claim 14, wherein the front most surface of the base plate and the back most surface of the top plate are coplanar with each other.

16. The adjustable strike plate assembly according to claim 14, wherein the base plate defines an upper horizontal slot and a lower horizontal slot, the upper horizontal slot and the lower horizontal slot separated by the interior aperture, and the top plate defines an upper mounting hole and a lower mounting hole, the upper mounting hole and the lower mounting hole separated by the central aperture and disposed through the top plate such that the upper mounting hole aligns with the upper horizontal slot and the lower mounting hole aligns with the lower horizontal slot.

17. The adjustable strike plate assembly according to claim 14, wherein the adjustable strike plate assembly is configured to be installed within a mortise pocket of a door frame, the base plate being configured to move laterally within the mortise pocket relative to the top plate, the top plate being fixed relative to the mortise pocket.

18. The adjustable strike plate assembly according to claim 14, wherein the base plate has an upper end, a lower end, a jamb side and a latch side, the base plate including a lip projecting from the latch side.

19. The adjustable strike plate assembly according to claim 18, wherein the lip projects from the latch side of the base plate such that the lip narrows as the lip extends distally from the latch side to a terminating edge of the lip.

20. The adjustable strike plate assembly according to claim 19, wherein the lip narrows to the terminating edge thereof defined by an angle between the latch side of the base plate and a lip side end, the angle being between 20 degrees and 60 degrees.

* * * * *